United States Patent

[11] 3,593,304

[72] Inventors Peter A. E. Gardner
Winchester;
Michael H. Hallett, Chandlers Ford, both of, England
[21] Appl. No 741,701
[22] Filed July 1, 1968
[45] Patented July 13, 1971
[73] Assignee International Business Machines Corporation
Armonk, N.Y.
[32] Priority July 29, 1967
[33] Great Britain
[31] 34961/67

[54] DATA STORE WITH LOGIC OPERATION
6 Claims, 3 Drawing Figs.

[52] U.S. Cl. 340/172.5
[51] Int. Cl. G06f 7/06
[50] Field of Search 340/172.5; 235/157

[56] References Cited

UNITED STATES PATENTS

| | | | |
|---|---|---|---|
| 3,241,123 | 3/1966 | Boucheron, Jr. | 340/172.5 |
| 3,292,159 | 12/1966 | Koerner | 340/172.5 |
| 3,329,938 | 7/1967 | Armstrong | 340/172.5 |
| 3,332,067 | 7/1967 | Bacon | 340/172.5 |
| 3,348,214 | 10/1967 | Barbetta | 340/172.5 |

*Primary Examiner*—Gareth D. Shaw
*Attorneys*—Hanifin and Jancin and William S. Robertson

ABSTRACT: This disclosure teaches a memory that performs logical operations by combining two or more words of data in a single storage location or on a storage signal carrying wire such that the data signals combine in ways that have logical significance. Threshold logic circuits are connected with the memory signal wires to propagate carries for addition or subtraction.

INVENTORS
PETER A. F. GARDNER
MICHAEL H. HALLETT
BY W. J. Robertson
ATTORNEY

DATA STORE WITH LOGIC OPERATION

RELATED DISCLOSURES

Examples of stores that perform logic are described in our copending applications Ser. No. 695,065 now U.S. Pat. No. 3,504,351, issued Mar. 31, 1970, and Ser. No. 695,377.

INTRODUCTION

Data stores usually consist of a plurality of bistable storage devices, each capable of storing a data bit, arranged to provide a plurality of word storage locations. Each binary storage device of a word location is associated with a particular bit position of a data register that communicates with the store, and similarly associated storage devices make up a bit position of the store. It is known to use data stores to perform logical operations on the data stored therein without recourse to external units or with recourse to external units solely to perform shifting operations.

Many logical operations can be performed within a store. These operations include transfer of data between word locations, transfer and inversion of data between word locations, the AND function involving the transfer of data from two or more locations and the storing of the result in another location, and majority logic operations.

In stores of this type corresponding bit positions in each of the word locations are connected to a common output or bit conductor. To perform a logical operation a word storage location (or more than one storage location) is interrogated by means of a control conductor connected to the storage device at each bit storage position of that word location. The resulting signals generated on the output or bit conductors can be used to store data in corresponding bit positions at another word location. When two or more locations are interrogated simultaneously the signals from corresponding bit positions add linearly on the output conductors. A word location usually corresponds to one row of a storage matrix, and the output or bit conductors are positioned along columns of the matrix.

One of the problems encountered in performing some logical operations is the transfer or shifting of data laterally in the store. The related disclosures teach a method of performing shift operations which uses gating circuits external of the store. Another method of shifting involves the provision of diagonal output conductors in addition to the normal output conductors. An object of this invention is to provide a new store having an improved means for a lateral shift, a feature that is particularly useful in performing carry propagation when the logic operation of the memory is addition of subtraction. Carry propagation, required when performing addition (or subtraction) previously required one cycle of the store to propagate the carry one bit position.

THE INVENTION

The present invention provides a data store capable of performing therein logical operations on stored data words, at a plurality of word storage locations. Each word location includes a plurality of bit storage devices. A plurality of bit conductors are connected in common to the storage devices occupying corresponding bit positions in each of the word locations. For each bit position there is a majority logic gate. Each gate connects a different pair of adjacent bit conductors and is adapted to produce a signal on one of the pair of conductors when the signal level on the other conductor of the pair exceeds a predetermined value. The bit wires are arranged for signals to add linearly when a plurality of words are read at the same time. As will be explained more specifically, the carry and sum functions are provided by the interconnections of the majority logic gates and the bit wires.

THE DRAWING

THE PREFERRED STORE

Introduction

Figure 1:
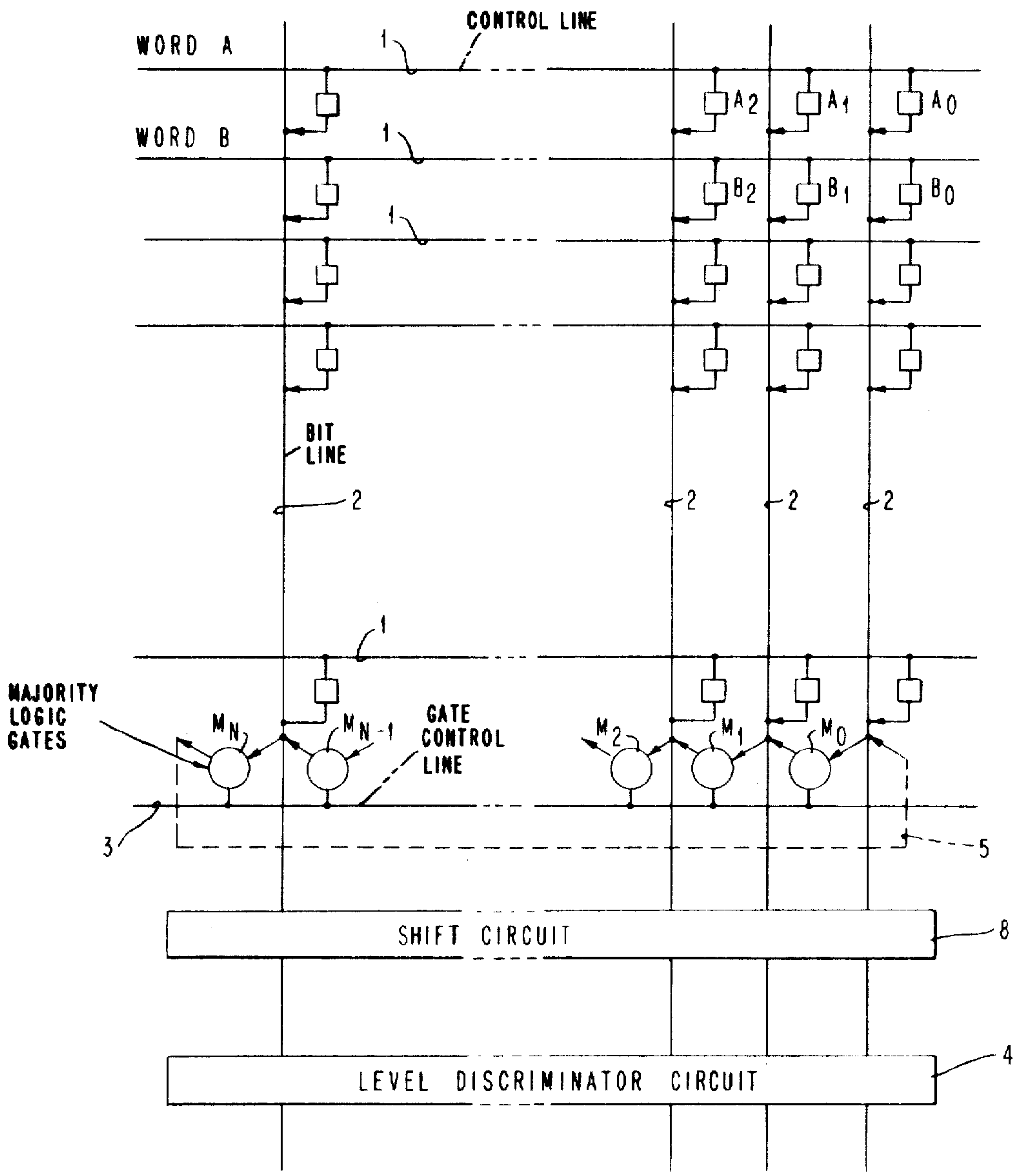
FIG. 1 shows a data store embodying the present invention.

FIG. 1 shows a data store having a plurality or word storage locations, each word location having a plurality of bit positions, $A_0$ to $A_N$, $B_0$ to $B_N$ etc. Each of the word locations occupies a row of a matrix, and each data bit in a word is stored in a storage device e.g. $A_N$. The storage devices of one row are connected to a common control conductor 1 and the devices which occupy the same column are connected to a common output or bit conductor 2. Data can be written into a selected word location, or row of the matrix by energizing the appropriate control and output conductors. The selected word location is energized by conventional addressing circuits (not shown) that respond to an address that is supplied to the store. A selected word location can be interrogated or read by energizing the control conductor of that word location. During an interrogate operation the output conductors carry signals representative of the data stored in the selected word. Data can be transferred from row to row by simultaneously energizing two rows of the matrix with the appropriate signal levels. Storage devices to perform such operations are described in more detail in the specifications of the above referenced patent applications.

Lateral transfer of data with respect to the columns or bit positions in a word have previously required one store cycle for each bit position shifted. To increase the speed of carry propagation, a plurality of majority logic gates $M_0$ to $M_N$ are provided. One gate is positioned intermediate and connected to each adjacent pair of output conductors. As the store is shown in the drawing, the input terminal of a gate is connected to the right-hand bit conductor and the output terminal is connected to the left-hand bit conductor and to the input terminal of the next gate to the left. The operation of the majority logic gates is controlled by a gate control line 3. An output is produced by a majority logic gate when the amplitude of the input signal exceeds a predetermined threshold value. The amplitude of the input signal depends on the number of signals generated by the interrogation of the storage devices and by the output of the preceding majority logic gate.

THE Storage Device

Figure 3:
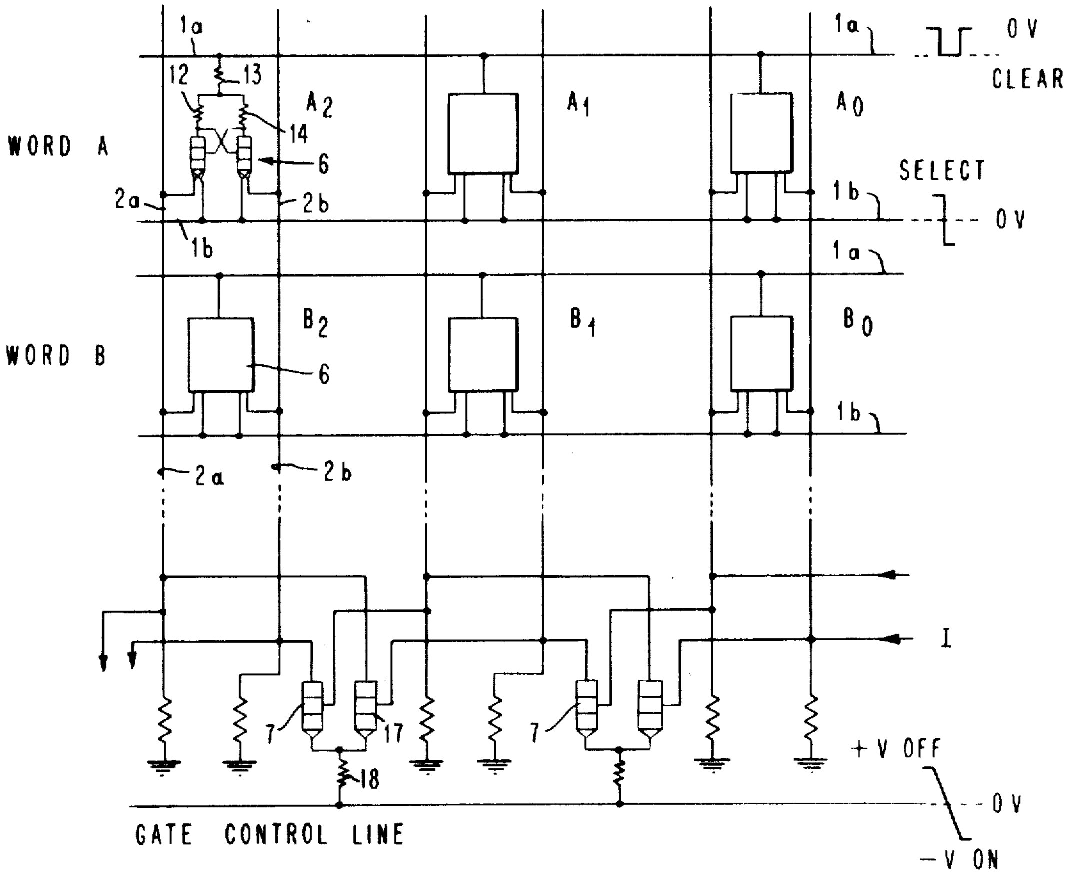
FIG. 3 shows a particular embodiment of the invention.

One form of storage device 6 is shown in FIG. 3. The storage device 6 includes a pair of multiple emitter transistors interconnected with resistors 12, 13 and 14 to form a bistable circuit. Lines **1*a* and 1*b* are connected to apply an operating and control potentials to the transistors. One emitter of each transistor is connected to one of the two separate output conductors or bit sense lines 2*a* and 2*b*. Each line 2*a* and 2*b* connects the corresponding emitter electrodes of the storage devices in the same column of the matrix. The other emitter electrode of each transistor is connected to the control conductor 1*b*. For a clear operation, a control conductor 1*a* is used to clear its associated row of devices in the store by lowering the voltage applied to the collectors of the transistors of each cell to zero volts. Control conductors 1*b*** are used to select a particular row by applying a positive pulse to its associated emitters. Normally the emitters are negatively biased and thus cannot be selected. Other data storage devices suitable for this type of store are described in the specifications of the above referenced patent applications.

The Majority Logic Gates

FIG. 3 also shows the majority logic gates. Each gate includes a pair of transistors 7 and 17 connected with a resistor 18 in a differential amplifier configuration in which one or the other of the transistors turns on to conduct. The base electrodes are connected to different ones of the output conductors of the next higher column of the matrix. In operation the emitter currents of the transistors 7, 17 are switched on by means of the gate control line. The gates are designed so that a differential voltage between lines 2*a* and 2*b* corresponding to a "one" bit signal is sufficient to switch the emitter current. The emitter current is arranged to be equal to the readout signal current from an interrogated storage device. The signal I (FIG. 3) introduced into the lowest order position provides a differential current corresponding to a "zero" bit signal except when an "end around carry" is introduced when performing 2's complement subtraction.

Operation

Addition can be performed in the store shown in FIG. 1 by using the majority logic gates to propagate the carry during one cycle of the store. Consider the addition of words A and B. The carry $C_x$ at a bit position $x$ is given by the Boolean expression:

$$C_x=A_x\cdot{}_x+B_x\cdot C_{x11}+A_x\cdot C_{x11}$$

where $A_x$ and $B_x$ are bits in words A and B respectively at bit position $x$ and $C_{x11}$ is the carry from the next lower bit position.

Figure 2:
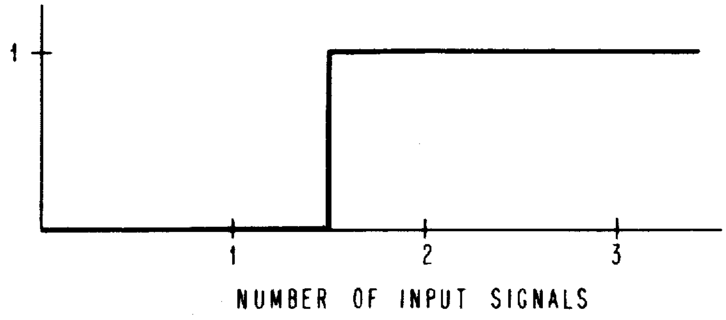
FIG. 2 shows the output characteristic of the majority logic gates used in FIG. 1.

$C_x$ is the majority logic function of the three terms $A_x$, $B_x$ and $C_{x11}$. To generate the carry, word A and word B are interrogated or addressed simultaneously. The resultant signals add on the output conductors by linear superposition. The output of each of the majority logic gates is also added on the bit conductors. The output characteristic of the majority logic gates is shown in FIG. 2. An output is produced when two or three input signals are present, as the above expression for a carry requires. The control line 3 turns the majority logic gates on and off. By means of the conductor 5 an "end around carry" can be introduced into the lowest order position of a word for 2's complement subtraction. The delay in propagating the carry is fixed only by the delay in the majority logic gates which can be very much less than the time required to perform a storage cycle.

The carry propagation can be completed in a time equal to (N−1) $x$, where is the switching delay of the differential circuit and N the number of bit positions in a storage word. The switching delay of the differential circuit can be of the order of 1 nanosecond. After this delay the bit conductors 2*a* and 2*b* have one or zero voltage levels that represent the binary one and zero values of the carry in the same way that bit conductor voltages produced by the storage devices of a single word represent a word of data. This word is then stored in a third location C by suitably energizing the conductor 1*a* for the selected location.

After the carry has propagated, the signals on the output lines 2 can be used to generate the logical sum. The signal levels can have one of the values 0, 1, 2, or 3 depending on which of the combinations of bits $A_x$, $B_x$ and $C_{x11}$ are present as shown in the Table below:

| Signal Level | Logical Function |
|---|---|
| 3 | $A_x\cdot B_x\cdot C_{x-1}$ |
| 2 | $A_x\cdot B_x\cdot C_{x-1}+A_x\cdot \bar{B}_x\cdot C_{x-1}+\bar{A}_x\cdot B_x\cdot C_{x-1}$ |
| 1 | $A_x\cdot \bar{B}_x\cdot \bar{C}_{x-1}+\bar{A}_x\cdot B_x\cdot \bar{C}_{x-1}+\bar{A}_x\cdot \bar{B}_x\cdot C_{x-1}$ |
| 0 | $\bar{A}_x\cdot \bar{B}_x\cdot \bar{C}_{x-1}$ |

The logical Sum $S_x$ is obtained by detecting signal levels 1 and 3 in level discriminator circuit since $S_x$ is given by the expression:

$$S_x=\bar{A}_x\cdot\bar{B}_x\cdot C_{x-1}+A_x\cdot\bar{B}_x\cdot\bar{C}_{x-1}+\bar{A}_x\cdot B_x\cdot\bar{C}_{x-1}+A_x\cdot B_x\cdot C_{x-1}$$

Suitable discriminator circuits are well known and are shown as a block 4 in FIG. 1.

Other Embodiments

The sum $S_x$ can be generated after the carry has propagated without using the signal level discriminator 4 shown in FIG. 1. When the storage devices 6 are used, the differential signal on output lines 2*a* and 2*b* represents the complement of the carry $C_x$ for each bit position. This may be stored at a word location for example $C_x$ (not shown).

The sum $S_x$ can be represented by the expression:

$$S_x=\bar{C}_x(A_x+B_x+C_{x-1})+A_x\cdot B_x\cdot C_{x-1}$$

$C_{x-1}$ can be obtained by interrogating word location $C_x$ and transferring the signals to a shift register, such as shift register 8 in FIG. 1, shifting the signals one bit position to the left and storing the complement of the signals in a word location $C_{x11}$.

The following majority logic operations are next performed in the store. (It is assumed that the words A and B are stored at locations A and B).

1. Interrogate words A, B and $C_x$ simultaneously to perform the majority logic operation;
2. Clear a new word location D and set result of operation 1 in location D by lowering the collector voltage using line 1*a*, and then raising it again after a suitable delay. The location D then stores the complement of the majority logic function of A, B and $C_x$, that is $A\cdot B+BC_x+AC_x$.
3. Interrogate words A, $C_{x11}$ and D simultaneously to perform the majority logic operation.
4. Clear location E and set result of operation 3 in a new word location E;
5. Interrogate words B, $C_{x11}$ and D simultaneously to perform the majority logic operation;
6. Clear a new word location F and set result of operation 5 in F;
7. Interrogate word D;
8. Clear word location D and set complement of D in D; and
9. Interrogate E, F and D simultaneously to perform the majority logic operation.

The differential signal on each of the pairs of bit lines 2*a* and 2*b* as a result of operation 9 represents the sum $S_x$.

This sequence can be speeded up by clearing word locations D, E, F and D simultaneously prior to operation 1.

While the invention has been particularly shown and described with reference to preferred embodiments thereof, it will be understood by those skilled in the art that the foregoing and other changes in form and details may be made therein without departing from the spirit and scope of the invention.

What we claim is:

1. A data store having a row and column array of bit conductors and word conductors connected with storage devices of the type that produce signals on the bit conductors representing a word of data when a word conductor of one or more words are energized for an interrogate operation and that respond to said bit conductor signals to write said word of data into a different location when a word conductor of said different location is energized, wherein the improvement comprises,
   - a threshold logic circuit for each bit position connected to respond to the voltage levels produced on a bit conductor during an interrogate operation and to produce a signal at an input of a different one of said threshold circuits according to a predetermined logic function of a plurality of simultaneously interrogated words.

2. A store according to claim 1 in which said logic function is the majority logic function and said logic circuits are interconnected to propagate the carry function of two words to be added or subtracted in the memory.

3. A store according to claim 2 in which each said bit position includes a pair of bit wires and said storage devices are connected to energize one or the other of the associated bit wires during an interrogate operation according to whether the storage device is in a one or a zero storing state.

4. A store according to claim 3 in which each of said logic circuits comprise a pair of transistors differentially connected to the associated bit conductor pair to conduct in one of two states to the storage states of the associated bits of the two interrogated words and the conduction state of any next lower order logic circuit.

5. A store according to claim 4 in which said storage devices include transistors having their emitter terminals connected to said bit conductors and said transistors of said logic circuits have their collector terminals connected to said bit conductors, whereby conduction of a storage device transistor and conduction of a logic circuit transistor have opposing effects on the signal level on a bit conductor, and means connecting the collector terminal of each logic circuit transistors to the complementary valued bit conductor for the next higher bit position 6. A store according to claim 2 further including a discriminator circuit for detecting the sum of the two words being added when said two words and a third word storing the results of a previous carry propagation are simultaneously interrogated.